US006418202B1

(12) United States Patent
Caldwell et al.

(10) Patent No.: US 6,418,202 B1
(45) Date of Patent: Jul. 9, 2002

(54) SPONTANEOUS MESSAGING SERVICE FOR PREPAID CALLING CARD USERS

(75) Inventors: Charles David Caldwell, Cliffwood Beach; Barry Shawn Seip, New Providence, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/179,302

(22) Filed: Oct. 27, 1998

(51) Int. Cl.[7] ............................................... H04M 1/64
(52) U.S. Cl. ............................... 379/88.25; 379/88.26; 379/114.2
(58) Field of Search ..................... 379/70, 82, 88.25, 379/88.26, 144, 144.01–144.07, 114.01, 114.15–114.2; 705/17

(56) References Cited

U.S. PATENT DOCUMENTS

| | | | | |
|---|---|---|---|---|
| 5,134,646 A | * | 7/1992 | Carlson ...................... 379/88.2 |
| 5,265,033 A | * | 11/1993 | Vajk et al. ................... 709/206 |
| 5,278,895 A | * | 1/1994 | Carlson ................... 379/88.25 |
| 5,483,581 A | * | 1/1996 | Hird et al. ................... 379/132 |
| 5,535,264 A | * | 7/1996 | Starr et al. ................ 379/88.25 |
| 5,721,768 A | * | 2/1998 | Stimson et al. ............. 379/114 |
| 5,745,553 A | * | 4/1998 | Mirville et al. ............. 379/67.1 |
| 5,825,863 A | * | 10/1998 | Walker ......................... 379/144 |
| 5,828,740 A | * | 10/1998 | Khue et al. .................. 379/144 |
| 5,995,822 A | * | 11/1999 | Smith et al. ................. 455/406 |

OTHER PUBLICATIONS

Bell Atlantic, Bell Atlantic Residence White Pages D.O.C., Bell Atlantic Directory Services, p. 12, May 1997.*
Bell Atlantic, Bell Atlantic Residence White Pages District of Columbia, May 1997–Apr. 1998, p. 12.*
AT&T Technical Journal, vol. 64, No. 6, part 2, pp. 1305–1564, Jul./Aug., 1985.
"Conversant Voice System and Applications" by Pardue et al. that was published in AT&T Technical Journal vol. 65, Issue 5, pp. 34–47, Sep./Oct. 1986.

* cited by examiner

Primary Examiner—Fan Tsang
Assistant Examiner—Roland G. Foster

(57) ABSTRACT

A communications system is designed to allow a temporary electronic find transfer from a pre-paid calling card balance to an account of the prepaid calling card issuer to take place when the user of such prepaid calling card number elects to record a spontaneous message for a called party. The transferred fund is either permanently deducted from the prepaid calling card balance when the recorded message is delivered to the called party, or partially or fully refunded to the prepaid calling card balance when the recorded message is deemed undeliverable.

8 Claims, 4 Drawing Sheets

*FIG. 2*

| PREPAID CALLING CARD NUMBER | ESCROWED AMOUNT | EXPIRATION DATE | EXPIRATION TIME |
|---|---|---|---|
| 201 | 202 | 203 | 204 |

SPONTANEOUS MESSAGING SERVICE FOR PREPAID CALLING CARD USERS

TECHNICAL FIELD

This disclosure relates to communications systems and, more particularly, to an improved spontaneous messaging service.

BACKGROUND

Spontaneous messaging is a communications service feature that is invoked when a communications service provider's network receives some indication that a call cannot be completed, due to a ring-no-answer or a busy-line condition at a called party's telephone set. The network or a component thereof, spontaneously invites the caller to record a message for the called party. Such a message is hereinafter referred to as a "spontaneous message". The recorded message is initially stored and subsequently delivered to the called party upon his or her availability. Specifically when the caller opts to record a spontaneous message for the called party, the network or a component thereof, attempts to deliver such spontaneous messages every thirty (30) minutes for example, for up to a certain number of hours. Spontaneous messaging service is presently available for credit card, calling card and conventional calls from communications carriers such as AT&T.

Over the last few years, however an increasing number of communications services users have evinced a preference for using pre-paid calling cards, as opposed to calling cards to complete telephone calls. Users' preference for pre-paid calling cards over conventional calling cards can be attributed to a number of factors that include elimination of bill payment, certainty about the cost per minute for the call, cheaper rates than calling card calls and ease of use, to name a few. Such ease-of-use is evidenced by the fact that a pre-paid calling card user who wishes to complete a calling card call needs simply to dial a toll-free telephone number, and then key in the prepaid calling card number (and optional password) printed on the prepaid calling card) followed by the destination telephone number. The call is then completed by the service provider that issued the pre-paid calling card after the appropriate checks for the availability and sufficiency of a balance on the account associated with the pre-paid calling card number. At predetermined time intervals during the call, the service provider debits from the account associated with the pre-paid calling card the appropriate amount of calling time used by the caller. Because the pre-paid card billing system deducts a fixed rate only for completed calls or other services rendered, pre-paid calling card users do not pay for services when the call is not completed due to ring-no-answer or busy-line conditions.

In spite of the popularity of pre-paid calling cards, the spontaneous messaging service feature is still unable to allow a pre-paid card caller to record a message for an unavailable called party. This is because the spontaneous messaging service has no mechanism to deliver such service for a fee. Specifically, the spontaneous messaging service has to identify an unequivocal billing number before a caller is allowed to record a spontaneous message. Such billing number is used to charge the caller when the recorded spontaneous message is delivered to the called party. In the case of pre-paid calling cards, a series of factors operate to make this conventional billing technique unavailing. One such factor is the uncertainty with respect to the availability and sufficiency of a balance on the account associated with the pre-paid card number to pay for message delivery when it occurs. For example, the account associated with the pre-paid card number may have been depleted by the time the message is delivered to the called party. Equally problematic is the lack of a mechanism to credit pre-paid calling card accounts for undelivered messages. Specifically, if the pre-paid card caller is charged for delivery of a message that cannot be delivered within the pre-determined delivery time window, the pre-paid caller would be charged for service that has not been rendered. Thus, a problem of the prior art is the inability of pre-paid calling card callers to receive spontaneous messaging service.

From a general perspective, prepaid calling card users are unable to receive any communication service that requires a refund mechanism to credit such users for any service charge when the communication service cannot be delivered.

At a yet higher level of generality, debit card users are unable to receive any service that may require an electronic refund of the fees charged when such service cannot be delivered within a predicted period of time.

SUMMARY

The present disclosure is directed to a method and a system that allow an account associated with a debit card to be debited to an escrow account when the user of such debit card elects to receive a service that is anticipated to be delivered or provided within a predetermined period of time. For example, an account associated with a pre-paid calling card number will be debited when a pre-paid calling card caller records a spontaneous message for a called party. The debited amount in the escrow account is either permanently deducted from the prepaid calling card account when the message is delivered, or partially or fully credited to the prepaid calling card account when the recorded message is deemed undeliverable.

In an exemplary embodiment of the principles disclosed herein, a pre-paid calling card caller is prompted to record a spontaneous message when the caller places a call to a called party who is unavailable due to a ring-no-answer or busy-line condition at the called party's telephone set. If the pre-paid calling card caller indicates a desire to record a spontaneous message for the unavailable called party, the service provider's network performs certain functions before such recording. One such function is to ascertain whether the remaining balance of the account associated with the pre-paid calling card number is sufficient to defray the anticipated cost of the spontaneous messaging service. Another one of such functions is to inform the caller that the cost of the service would be fully or partially refunded in the event that the message cannot be delivered to the called party within a predetermined time period. Yet another function performed by the network of the service provider is to create an electronic escrow account for the card number. Finally, the service provider's network transfers the message delivery service fee from the account of the pre-paid calling card number to the newly created escrow account.

If the spontaneous message previously recorded by the caller is delivered to the called party, the amount of money in escrow is then transferred to the card issuer. When the messaging service is unable to deliver the spontaneous message to the called party before the expiration of the predetermined time period for such delivery, then the amount of money in escrow is returned to the account for the pre-paid calling card (less any agreed-upon usage fee, if any).

BRIEF DESCRIPTION OF THE DRAWINGS

FIGS. 2, 3 and 4 illustrate programmed instructions executed by different components of FIG. 1 to implement the principles disclosed herein.

DETAILED DESCRIPTION

Figure 1:
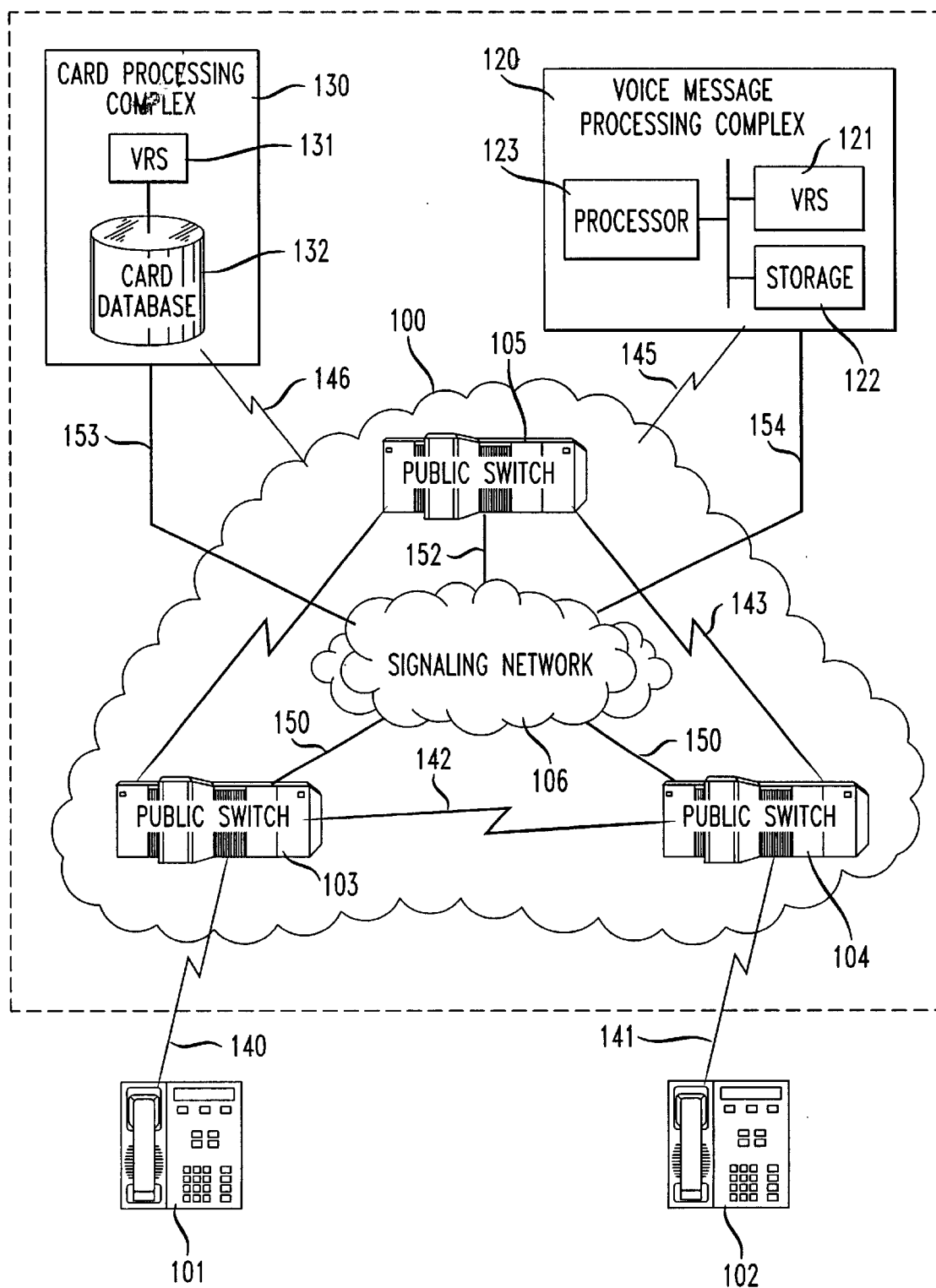
FIG. 1 show in block diagram format a communications network arranged in accordance with the principles disclosed herein to allow pre-paid calling card callers to receive spontaneous messaging service.

FIG. 1 shows in block diagram format a communications switching system 100 which includes access/egress communications switches 103, 104 and 105 that are connected to a common signaling network 106 via trunk facilities 150, 151 and 152, respectively. Switches 104 and 105 are processor-controlled, software-driven communications systems that are arranged to route calls to destinations specified in call setup information received from end-user devices such as analog telephone sets 101 and 102. A well-known communications switch is the Lucent Technologies 5ESS® switch whose features and functionality are described in different articles published in the AT&T Technical Journal, Vol. 64, No. 6, part 2, pp. 1305–1564, July/August, 1985.

Communications switches 103 104 and 105 exchange call processing messages via signaling network 106 and signaling trunks 150, 151 and 152. Signaling network 106 is comprised of a plurality of interconnected packet switching nodes that route call processing messages to their appropriate destinations according to a defined protocol, such as the well-known Common Channel Signaling (CCS) protocol. It is worth noting that although the communications switching system 100 of FIG. I does not show (for the sake of simplicity) any toll switches or Inter-exchange carrier network, it is to be understood that one or more toll switches may be included in communications switching system 100.

Also shown in FIG. 1 is voice message processing complex 120 that includes a Voice Response System (VRS) 121, a storage area 122 and a processor 123. Voice message processing complex 120 is arranged to execute a set of scripts that may be stored either in the memory (not shown) of processor 123 or in storage area 122. Such scripts are executed by VRS 121 to answer an incoming call and to greet a caller with a pre-recorded voice announcement inviting a caller to leave a message for a called party. VRS 121 selects a particular set of scripts to be executed based on particular call processing messages received from communications switch 103 (104, 105) via signaling network 106. A call processing message may instruct VRS 121 to play a specific announcement to a caller based on terminating supervisory signals or call progress tones (busy, ring-no-answer) associated with an attempted call. For example, an announcement may indicate to a caller that the line for the called party is either currently busy or is unavailable to answer a call. The announcement may further indicate that the caller may record a message that will be delivered to the called party as soon as the called party's line becomes available. As mentioned above, voice message processing complex also includes a processor 123 and a storage area 122. A VRS may be implemented using a suitably modified Lucent Technologies Intuity® Voice System whose architecture and features are described in an article entitled "Conversant Voice System and Applications" by Pardue et al. that was published in AT&T Technical Journal Vol. 65, Issue 5, pp. 34–47, Sept/Oct. 1986.

Also shown in FIG. 1 is card processing complex 130 that includes a VRS 131 and a card database 132. Card processing complex 130 is arranged to process debit card transactions initiated by a caller for receiving a communications service. When a caller dials a toll-free number to receive a communications service, the call is originally completed to VRS 131 of card processing complex 130. VRS 131 prompts the caller to enter the debit card number. Upon receiving the prepaid card number, VRS 131 launches a query on card database 132 to ascertain whether the card number is valid as well as the remaining balance for that card number. In the case of pre-paid calling cards, the user is typically informed of the number of remaining calling minutes for the calling card account.

Optionally, communications switching system 100 of FIG. 1 may be replaced with a computer network (not shown) that is comprised of interconnected processing nodes (including a voice message processing complex and a debit card processing complex) arranged to a) switch digital signals according to a common addressing protocol, such as the Internet Protocol (IP), and b) to deliver spontaneous messaging service to debit card callers.

The process contemplated by this disclosure is initiated in step 301 when communications switching system 100 receives call setup information for a call that is initiated by a prepaid calling card caller and that is directed to a called party. As is well known in the art, a prepaid calling card call requires the caller to dial a toll-free number of the card issuer for an initial connection to card processing complex 130. Thus, the communications switch that receives the call setup information forwards such information to card processing complex 130 where VRS 131 prompts the caller to enter his or her card number to process the call. Upon receiving the card number, VRS 131 transmits a signaling message that includes the card number, to card database 132. The latter uses the received card number to retrieve the account record associated with the card number. Card database 132 then transmits the content of the account balance field to VRS 131 that may deliver an announcement to the caller informing him or her of the starting balance for the pre-paid calling card. Thereafter, VRS 131 prompts the caller to enter the called party number. For the sake of simplicity and clarity, it will be assumed that the prepaid calling card call is initiated from telephone set 101 and is destined for telephone set 102.

Upon receiving the called party number, VRS 131 forwards the call setup information to communications switch 104 via signaling network 106. Communications switch 104 then completes the call to telephone set 102. If the called party is available, as determined in step 302, then the prepaid calling card call is completed in step 303 in a conventional manner. If the called party is not available because line 122 is already seized or a ring-no-answer condition is encountered at telephone set 102, as determined in step 302, then communications switch 104 transmits a signaling message to VMPC 120 via signaling network 106 and signaling link 154 to initiate the spontaneous messaging process. Thereafter, communications switch 104 releases forward the connection to telephone set 102 and transfers the call to VPMC 120 via trunk 145.

Once a connection is established between the caller and VPMC 120, VRS 121, in step 304, prompts the caller to record a spontaneous message for the called party. The type of announcement delivered to the caller by VRS 123 depends on whether the line is busy or a ring-no-answer condition is encountered. When the line is busy, VRS 123 may deliver the following illustrative announcement "The party to whom your call is directed is busy on another call, if you wish to leave a message for that person, please press 1". When a ring-no-answer condition is encountered, VRS 123 may deliver the following illustrative announcement "It appears that the party to whom you call is directed is unavailable, if you wish to leave a message for that person, please press 1". If the pre-paid calling card caller elects not to record a message, as determined in step 305, the process is then terminated in a conventional manner as indicated in step 306. Similarly, if the account balance for the pre-paid calling card is insufficient to defray the cost of the spontaneous message service, the process is terminated in a conventional manner as indicated in step 306. If on the other hand, the caller presses 1 on the dial pad of telephone set 101, as determined in step 305, VRS 123 in step 307, delivers an announcement to the caller informing him or her of the service fee for delivering the recorded message. Optionally, the announcement may also provide the caller with logistical information regarding the message delivery. For example, the announcement may inform the caller of the time window (e.g., twelve hour) within which the service provider will attempt to deliver the recorded message. Additionally, the announcement may also inform the caller of the number of message delivery attempts within a given period of time e.g., three attempted deliveries of the message per hour.

Once the caller has finished recording the message, processor 123 of VPMC 120 in step 308 initiates an electronic fund transfer from the caller's pre-paid calling card account to an escrow account of the card issuer. The electronic fund transfer process may be accomplished in many ways. One such way is for processor 123 to create an escrow account record and a signaling message to be transmitted to card processing complex 130. The signaling message would indicate the exact amount to be debited from the calling card account for credit to the newly created escrow account.

An illustrative record for an escrow account is shown in FIG. 2. Field 201 in the record identifies the prepaid calling card account number. Field 201 is used to identify the proper account to which a refund should be credited when the spontaneous message recorded by the pre-paid calling card user is deemed undeliverable. Field 202 stores the amount of money that is held in escrow. Such amount of money does not include any non-refundable fee that may be charged to a user for unsuccessful attempts to deliver a message recorded by the user. Of particular significance in the record for an escrow account are the expiration fields, namely expiration date 203 and expiration time 204. The expiration fields 203 and 204 indicate the time and date at which processor 123 has to refund the amount held in escrow when the message recorded by the caller has not been delivered to the intended recipient. Alternatively, the record may include a flag field that is used to mark or stamp the record "delivered" after successful delivery of the message to the targeted destination number which can be another optional field in the escrowed account record as well. Escrowed account records can be automatically removed either at the end of the expiration time and date, or after successful delivery of the recorded message. Alternatively, such records may be kept in storage area 122 for a finite period of time for archival purposes.

Figure 3:
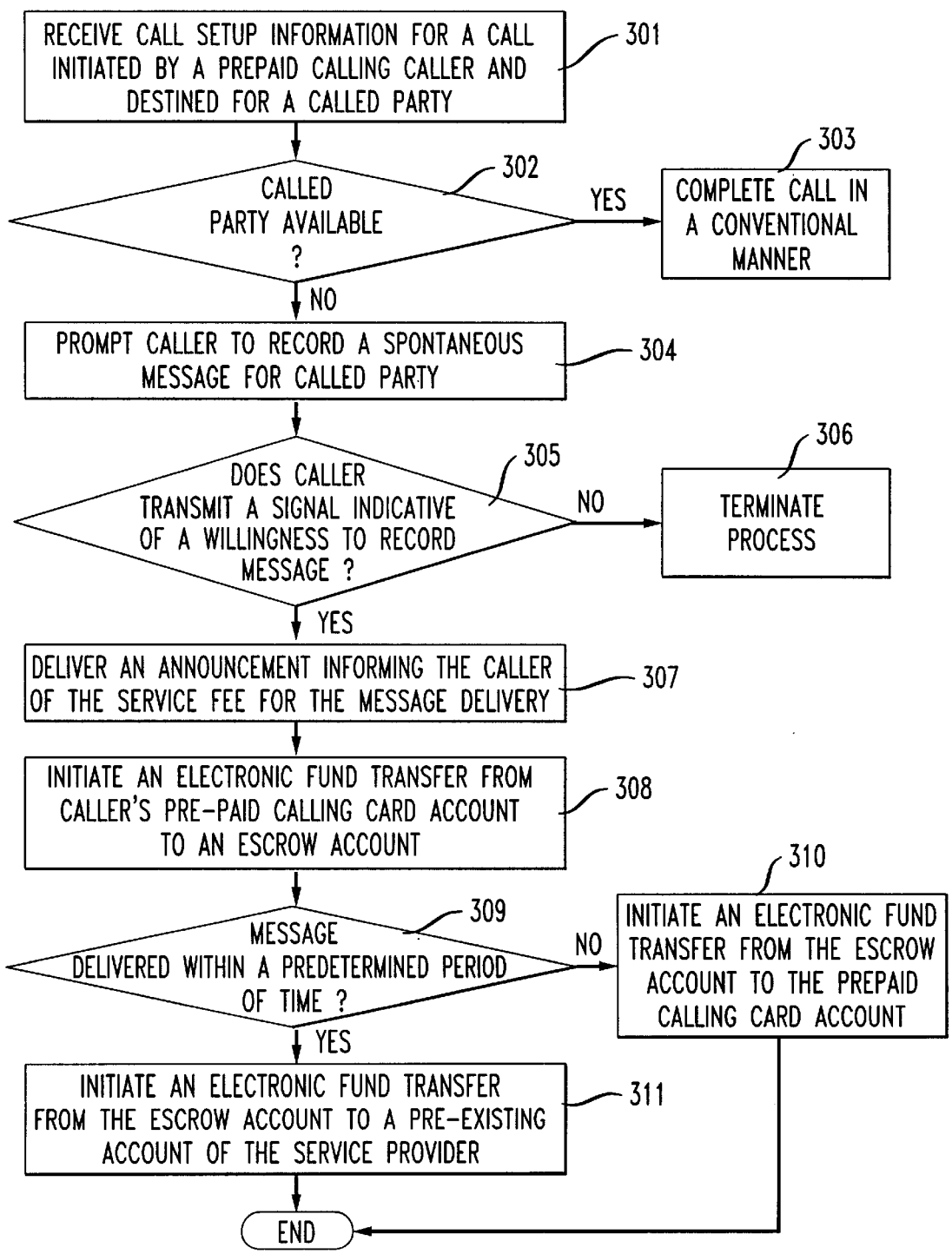

With further reference to FIG. 3, when VRS 121 stores a recorded message for a prepaid calling card caller, VRS 121 attempts to deliver the message to the intended recipient a predetermined number of times e.g., two (2) times within a given time period e.g., one (1) hour for a certain number of hours e.g., twelve (12) hours. As indicated above, a delivered message causes the "delivered" flag to be turned on in the escrow account record. When the message recorded by the prepaid calling card is delivered to the intended recipient, as determined in step 309, the escrowed amount is then transferred in step 310, to a permanent account of the card issuer. It is worth noting that the step of transferring the escrowed amount to a permanent account allows the amount in escrow to be under the control of a neutral third party, as opposed to the control of the card issuer. However, those of ordinary skill in the art would readily understand that the escrowed amount does not need to be transferred when such amount is under the exclusive control of the card issuer.

At the end of the expiration date and time, processor 123 determines, in step 309 whether the recorded message was delivered to the called party. If the escrowed account record is not stamped "delivered" as determined in step 309, then in step 311, the escrowed amount is returned and added to the existing balance of the prepaid calling card account.

Figure 4:
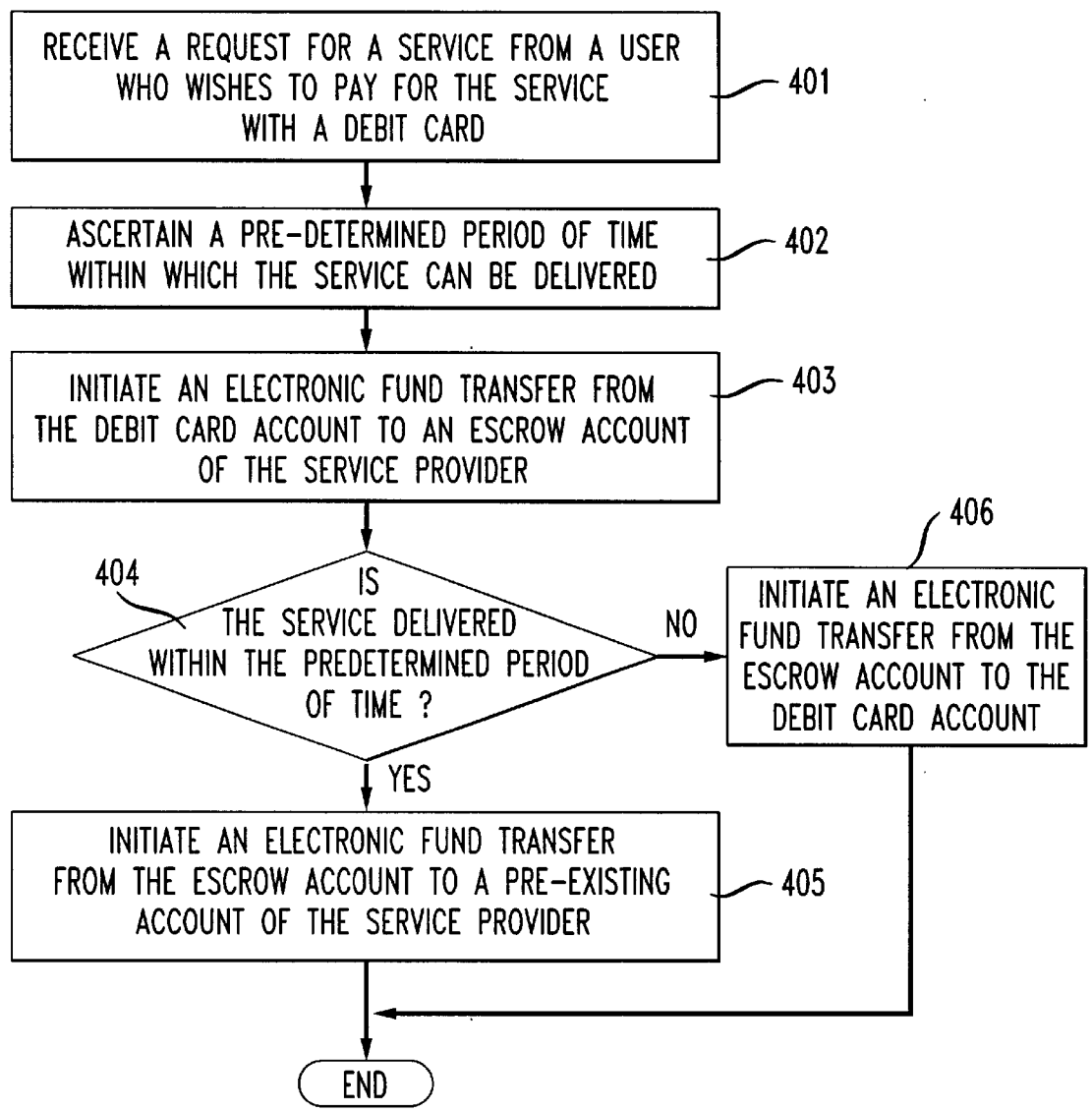

FIG. 4 shows programmed instructions executed by different components of FIG. 1 to implement the principles of the present disclosure. The process illustrated in FIG. 4 is initiated in step 401 when communications switching system 100 receives a request for a communications services from a user who wishes to pay for the service with a debit card. Upon ascertaining in step 402 that the communications service requested by the user cannot be delivered immediately and at best can only be delivered within a particular time window, processor 123, after delivering the appropriate greetings and informative announcements to the user, initiates an electronic fund transfer in step 403 from the user's debit card account to an escrow account of the network operator. It is worth noting that the communications service requested by the user can be provided either by the operator of communications switching system 100 or by a third party who uses network-based or premises-based communications equipment coupled to communications switching system 100 for providing such service. Similarly, the escrow account can be maintained by a third party that is independent from the network operator, the service provider or both.

The electronic fund transfer operation involves the creation of the escrowed account record shown in FIG. 2. Thus, at the end of the expiration date and time, communications switching system 100, in step 404, determines whether the service requested by the user was delivered. If so, communications switching system 100 in step 405 initiates an electronic fund transfer from the escrow account to an account of the service provider. However, when the service requested by the user was not delivered at the end of the expiration date and time, as determined in step 404, then communications switching system 100 initiates an electronic fund transfer from the escrow account to the account associated with the user's debit card.

The foregoing is to be construed as only being an illustrative embodiment of the principles of this disclosure. Persons skilled in the art can easily conceive of alternative arrangements providing functionality similar to this embodiment without any deviation from the fundamental principles or the scope of this disclosure.

We claim:

1. A method implemented by a card issuer for providing spontaneous message delivery service to a prepaid calling card user, said method comprising the steps of:

determining that a call that is initiated by a pre-paid calling card caller and that is destined for a called party cannot be completed;

inviting said pre-paid calling card caller to record a spontaneous message for said called party; and in response to said pre-paid calling card caller recording said spontaneous message, initiating an electronic fund transfer of a predetermined amount of money from a balance of said pre-paid calling card to an escrow account of said card issuer, said amount of money being temporarily deducted from said pre-paid calling card balance.

2. The method of claim 1 further comprising the steps of:

electronically transferring said fund from said escrow account back to said pre-paid calling card balance when said spontaneous message cannot be delivered within a predetermined time period.

3. The method of claim 2 wherein a portion of said fund is retained by said card issuer as a usage fee for attempting to deliver said spontaneous message.

4. The method of claim 1 wherein said fund is permanently deducted from said pre-paid calling card balance when said spontaneous message is delivered.

5. The method of claim 1 further comprising the step of assessing whether said pre-paid calling card balance has enough money before effectuating said transfer of funds.

6. The method of claim 1 wherein said inviting step includes the step of:

delivering an announcement to inform said pre-paid calling caller of a specific charge for said spontaneous message delivery.

7. The method of claim 6 wherein said announcement further informs said pre-paid calling card caller of a predetermined period of time within which said card issuer will attempt to deliver said spontaneous message.

8. The method of claim 7 wherein said announcement further informs said pre-paid calling card caller of a number of attempts for message delivery within a time window.

* * * * *